United States Patent [19]
Kratky et al.

[11] Patent Number: 5,210,973
[45] Date of Patent: May 18, 1993

[54] TRELLIS CLIP

[75] Inventors: Bernard A. Kratky; Gaillane Maehira, both of Hilo, Hi.

[73] Assignee: University of Hawaii, Honolulu, Hi.

[21] Appl. No.: 697,025

[22] Filed: May 7, 1991

[51] Int. Cl.$^5$ .............................................. A01G 17/06
[52] U.S. Cl. ..................................................... 47/44
[58] Field of Search ...................... 47/44, 42; 135/119, 135/120

[56] References Cited

U.S. PATENT DOCUMENTS

| | | |
|---|---|---|
| 278,097 | 5/1883 | Collins . |
| 485,912 | 11/1892 | Derby . |
| 619,379 | 2/1899 | Williams et al. . |
| 931,754 | 8/1909 | Greenleaf . |
| 1,529,705 | 3/1925 | McKnight . |
| 1,660,829 | 2/1928 | Burd . |
| 2,229,935 | 1/1941 | Powers . |
| 2,438,101 | 3/1948 | Wright . |
| 2,466,083 | 4/1949 | Crosby . |
| 2,984,938 | 5/1961 | Crawford . |
| 3,309,745 | 3/1967 | Gintz et al. . |
| 3,518,791 | 7/1970 | Carson et al. . |
| 3,800,365 | 4/1974 | Bruggert . |
| 4,099,299 | 7/1978 | Bruggert et al. . |
| 4,201,013 | 5/1980 | Robbins . |
| 4,354,299 | 10/1982 | Maidhof . |

FOREIGN PATENT DOCUMENTS

| 44642 | 5/1908 | Switzerland | 47/44 |
| 4389 | 3/1884 | United Kingdom | 47/44 |

*Primary Examiner*—Richard E. Chilcot, Jr.
*Assistant Examiner*—Joanne C. Downs
*Attorney, Agent, or Firm*—James C. Wray

[57] ABSTRACT

The present invention is an apparatus for suspending objects such as plants, specifically in a clip and string combination for applying upward direction. One end of the string is fastened to the object to be supported. The string is subsequently placed over a horizontal support wire above the object. The other end of the string is attached to an upper arm of an S-shaped clip, which is bent in two planes and which may alternatively incorporate more adjacent arms. The portion of the string between the object and the support wire is woven between the arms of the clip, which is then pushed downward on the string until it is taut. Periodically, as in the cycle of a plant, the clip can be adjusted along the string.

1 Claim, 2 Drawing Sheets

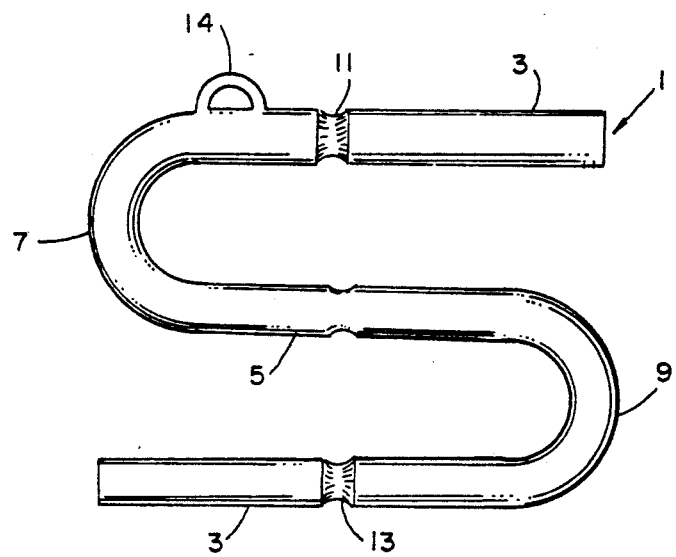
FIG. 1
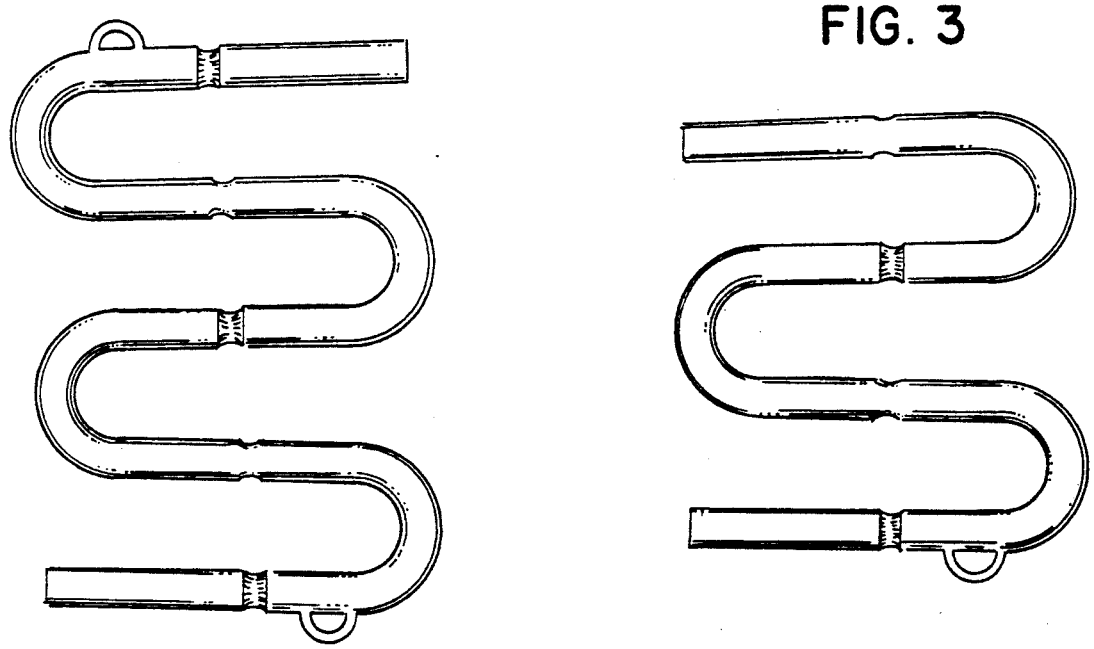
FIG. 2
FIG. 3

TRELLIS CLIP

BACKGROUND OF THE INVENTION

The present invention relates to trellis clip or otherwise to clips for supporting objects suspended, supported or trained on a wire. Specifically, the present invention deals with that art in which one end of a support cord is fastened to the object to be supported and the other end is fastened to an adjustment means, wherein the central portion of the cord is wrapped around a stationary support. The adjustment means releasably attaches to the intermediate portion of the cord for sliding thereupon to allow adjustment of tension on the object to be supported.

Many such objects are on the market, but there exists a need for one of simple and inexpensive construction which can be used with ease and reliability. Many of the present structures require threading of the whole cord through the apparatus and/or lengthy assemblage. Further, many of these are expensive to make because of the complicated design required to make them useful. The present invention addresses this need, as will be described in the ensuing disclosure.

SUMMARY OF THE INVENTION

In a preferred embodiment of the invention, steel wire is bent in either the shape of an "S" or an "S" with another leg, i.e. a modified "M" or "W" shape. Legs should be $\frac{1}{2}$" to 2" long, separated from each other on a vertical plane by $\frac{1}{8}$" to $\frac{1}{2}$" (and this is accomplished by a simple 180° curve at the end of each leg, excepting one end of both the uppermost and lowermost legs), and should be 5° to 90° in a horizontal plane from the legs immediately above and below them. It is preferable that every other leg be in the same horizontal plane. For tomato trellising, the preferred shape of the clip would be three or four legs made of 12-gauge steel wire, such that each leg is 1" long, and legs are vertically separated from each other by $\frac{1}{4}$" and horizontally by 1/16".

A string is tied to a plant and placed over a support wire. The loose end of the string is tied to about the midpoint of the upper leg of the wire clip.

For the three-legged S-clip, the string directly connected to the plant (i.e. the string on the other side of the support wire) is placed over the top leg of the clip and under the second leg. Then the clip is pulled gently snug, such that the plant is firmly supported. The first two legs of the clip are held with the left thumb and forefinger and tilted downwards about 45° while the right thumb and forefinger are holding the string attached to the plant. The string is placed over the top of the third leg and centered on the clip. Alternatively, the string is placed over the top leg, under the middle leg and over the bottom leg, or vice versa, while the string is slackened. The clip is tilted to the extent that there is no friction on the bottom leg, and then the clip is glided down the string until it becomes snug and the clip is then released such that the string exerts friction on all three legs. The plant now remains firmly supported.

As the plant grows, additional windings of string will be needed around the new growth. Again, the clip is tilted to the extent that there is no friction on the third leg of the clip and the clip is glided upwards, thus creating slack in the string. A winding of string is made around the plant and the clip is now glided downwards until the string is snug. The effort of untying and retying the string has, therefore, been saved.

The operation of the four-legged clip is similar to that of the three-legged clip. The string may be placed over the top leg, under the second leg, over the third leg and under the fourth leg (or vice versa) while the string is slackened. The clip is then tilted to the extent that there is no friction on at least two of the legs, and the clip may be glided downwards until the string is snug or upwards to slacken the string.

The present clip is made of common wire and is inexpensive to manufacture.

The new clip is easy to thread due to its long legs and the arrangement of the legs as slots rather than holes.

The wire of the clip is round. Thus, there is less tendency to cut the string. The round wire also increases the desired friction with the trellis string.

The preferred form is a wire clip device in the form of a modified "S" or "W" shape, with legs $\frac{1}{2}$" to 2" long and separated from each other on a vertical plane by $\frac{1}{8}$" to $\frac{1}{2}$" or more. That is accomplished by a radiused 180° curve at the end of each leg, excepting at the remote ends of both the uppermost and lowermost legs. Each leg may be offset from 2° to 90°, preferably about 5°, in a horizontal plane from the legs immediately above and below it. It is preferable that every other leg be in the same horizontal plane.

The clip is attached to a string. A stationary load is attached to the other end of the string. The string is supported by a support located above the attachment point of the load. The string immediately above the load is intertwined through the legs of the wire clip, and the resulting friction of the wire clip with the string causes the load to remain stationary and supported by the support.

The clip may be momentarily changed in orientation from a generally vertical plane to a generally horizontal plane, thus decreasing the friction with the string. That allows an easy upward movement of the clip, with the string sliding through its legs. That action provides a slackening of the string to the load, such that readjustments may be made to the load, e.g. an additional encirclement of a plant with string. The clip may then be slid downward until the string is tight and the load is fully supported.

The clip may have three or more legs to exert friction against the string. The clip may be made of any type of wire or of molded plastic.

In one embodiment, an eyelet in the top leg provides a uniform attachment point with the string.

The lengths of the legs, gauge of the wire, distance between the legs, and deviation of the legs from a horizontal plane are controlled according to the purpose of the clip.

There are many other uses for the transplant clip. The transplant clip may be used for any application where a stationary load needs to be supported. Examples include holding curtains that are controlled by cords in certain positions.

Economic considerations demonstrate the unique and unobvious nature of the clip. A four-legged trellis clip made of 12-gauge wire weighs about 3 grams. If wire costs about $0.75/lb., the raw material cost would be $0.005 per clip. Since the tooling and factory operations would be relatively uncomplicated, it would be possible for the clips to retail at 2¢-3¢ each. A competing gripper rope cleat retails for $5.17 each. Trellising plant clips retail for 2¢ each, but about five clips are needed per plant. The tapener machine would likely use about 1¢ of materials per plant, but these would be disposable whereas the trellis clip is reusable.

The trellis clip saves about 10 seconds as compared with tying a knot. About six tyings are needed per plant per crop. This difference in times represents a savings of about 1 minute per plant. If field labor is valued at 10¢/minute, the trellis clip would pay for itself several times over during the first crop of use.

In one embodiment, U-shaped bends or grooves in each leg prevent the string from horizontal movement. Grooves are preferably in the middle of the legs, and the width of the grooves is slightly greater than the thickness of the string.

In one embodiment, the wire or plastic is rolled, knurled or altered to increase the frictional capability.

Applications of the wire clip of the present invention include:
  trellising of horticultural crops such as tomatoes, peppers and cucumbers;
  quick attachment of tent ropes;
  quick attachment of ropes in marine, household, industrial and agricultural uses;
  quick attachment of blinds and curtains;
  for hanging meats and sausages;
  for flag ropes;
  for hanging or suspending automotive and other parts and clothing in a retail shop;
  for uses in a theater to suspend scenery;
  for a designer belt buckle—especially for some with a "M" or "W" initial;
  a device to quickly tie or loosen shoe strings on shoes;
  a device to quickly tie or loosen strings in any application where strings are used.

The potential for this invention is large. For example, this device incorporated into shoe designs would create a huge market.

These and further and other objects and features of the invention are apparent in the disclosure, which includes the above and ongoing written specification, with the claims and the drawings.

BRIEF DESCRIPTION OF THE DRAWINGS

FIG. 1 is a front view of the trellis clip of S-shaped configuration, cord attachment eyelet and retaining grooves.

FIGS. 2 and 3 are alternate embodiments of the clip having multiple legs in an S-shaped continuum.

DETAILED DESCRIPTION OF THE DRAWINGS

Figure 4:
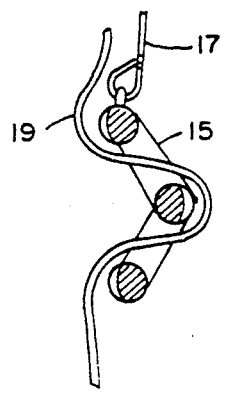
FIGS. 4 and 4a are side views of two preferred clips showing the parallel, offset legs and intertwined cord.

A trellis clip, generally indicated by the numeral 1 in FIG. 1, incorporates a series of parallel legs 3, of which there are end legs as shown by 3 and an intermediate leg or legs 5. The legs are joined by alternating 180° turns 7 and 9, which form an S-like unitary structure. More turns and legs can be added to form S-shaped continuums, as in FIGS. 2 and 3. Adding more legs presents more friction-bearing surfaces for a cord to wrap around, and thus increase the load which the clip can bear.

The clip can incorporate retaining grooves 11 correspondingly placed on the successive legs. The grooves halt sideways slippage of the emplaced cord. The grooves can be fitted with friction material 13 to reduce vertical slippage, or alternatively the clip can be made of rolled or knurled material or altered in some way to increase the friction capability on it. Adhesives and the like can be provided within the grooves or on the legs of the clip. An eyelet 14 can be provided on at least one end leg of the clip for tying a loose end of the support cord. The eyelet 14 could also be provided on one of the intermediate legs. However, it is not necessary for the clip to include an eyelet as the cord may be tied to the clip at any functionable point.

Figure 4A:
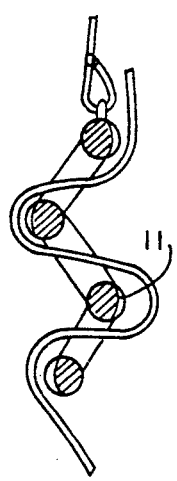

Preferable embodiments of the clip include a unitary structure made of one of various gauges of steel or metal alloys, of plastic, wood or other suitable materials. It is preferable for the retaining grooves to be proximal the middle of the legs to provide the widest side-to-side berth if slippage does occur. These grooves are also preferably slightly wider than the thickness of the cord, so that vertical movement is not unduly hampered when the height of the cord is being manually adjusted. FIGS. 4 and 4a disclose the intertwining of the cord between the legs of three-legged and four-legged embodiments of the present invention. Attachment of the loose end to a top end leg, and angled turn sections are also provided, wherein the angled sections offset alternating legs. This causes the cord to be widely swayed around alternating legs, which inhibits vertical slippage of the string. The angled legs form two planes between which the angled turns alternate in joining successive legs. The retaining grooves 11 are formed on the outside of the legs to prevent horizontal slippage, wherein frictional devices can be added to the grooves or the surface of the legs. Wrapping the cord around the successive legs creates vertical tension, which disallows slippage.

Figure 5:
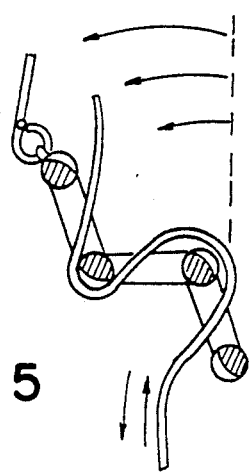
FIG. 5 shows the means of adjustment for the trellis clip on the suspension cord.

In order to adjust the clip on the cord, the clip is rotated away from the end leg abutments with the cord, as shown in FIG. 5. This disengages at least one of the exterior legs from the cord and provides easier movement of the cord through the intermediate legs. Slick or polished areas on the successive legs could be provided so that the string may be horizontally adjusted to the slick areas, therefore making vertical movement easier.

Figure 6:
FIG. 6 shows the trellis clip suspension system.
Figure 6:
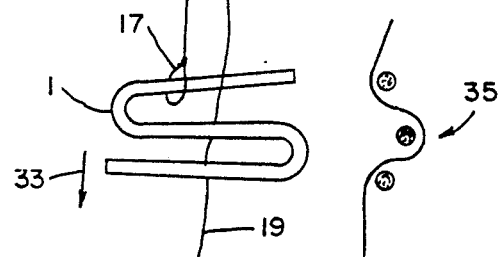
Figure 6:
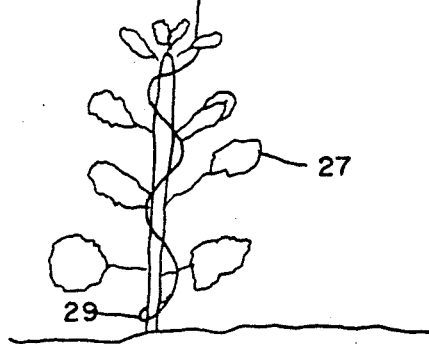

The trellis clip system, as shown in FIG. 6, discloses the object to be suspended or lifted, in this case a plant 27, to which one end of a cord or string is attached and wound around. The string is wrapped over a suspension wire 31 and has a clip end 17, which is tied or attached to the trellis clip 1. A central cord portion 19 between the support wire and the plant is intertwined between the legs of the clip. Vertical tension is provided when the clip is moved downward as by arrow 33, thus causing the cord to be pulled further over the suspension wire. The sliding motion is provided through the action disclosed in FIG. 5. As in the case of a plant, this may be done periodically to keep up with the growth of the plant. Trellis clip cross-section 35 provides the illustration of the intertwining of the intermediate cord portion 19, a more detailed view of which may be shown in FIG. 4. Heavier loads could be handled by increasing the number of legs and/or providing friction devices on or in the clip. Varying the spacings of the parallel legs would also vary the ability to bear weight, as would varying the angled portions of the turns as well as gauge or strength of the clip material. Angles of between 5° and 90° are within the scope of the invention, with the greater weights being borne on angles closer to 90°.

In a preferred embodiment, the legs of the clip should be ¼" to 2" long and separated from each other on a vertical plane by ⅛" to ¼". Every other leg should be in the same horizontal plane so that two planes are prescribed by the alternating groups of legs. 12-gauge or 14-gauge steel wire can be molded or bent into the S-shaped clip. A support string or cord can be tied to one of the legs or drawn under an eyelet provided on the wire.

While the invention has been described with reference to specific embodiments, modifications and variations of the invention may be constructed without departing from the scope of the invention, which is defined in the following claims.

We claim:

1. A method of supporting stems of growing plants comprising attaching a first end of a cord to one leg of a self-adjusting trellis clip having at least three parallel legs joined on alternating sides through 180° turns, extending the cord upward and over a support wire, and downward from the wire slidingly inserting the cord laterally into spaces between the legs of the trellis clip and extending the cord downwardly from the clip, tying a second end of the cord to a plant stem, growing the plant and extending the stem, tipping the clip, sliding the clip upward along the cord and creating slack in a portion of the cord below the clip, looping the slack portion around an extended portion of the stem and lowering the clip along the cord for tensioning the cord and supporting the extended stem without untying and retying the cord on the stem.

* * * * *